US008595320B2

(12) United States Patent
Sabir et al.

(10) Patent No.: US 8,595,320 B2
(45) Date of Patent: Nov. 26, 2013

(54) IF-NONE-MATCH FOR AGGREGATED PAGE DISTRIBUTION

(75) Inventors: Kenneth S Sabir, Marrickville (AU); Samuel J Tannous, Penshurst (AU)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 12/951,942

(22) Filed: Nov. 22, 2010

(65) Prior Publication Data

US 2012/0131132 A1    May 24, 2012

(51) Int. Cl.
*G06F 15/16* (2006.01)

(52) U.S. Cl.
USPC .......................................... 709/217

(58) Field of Classification Search
USPC .......................................... 711/138; 709/203
See application file for complete search history.

(56) References Cited

U.S. PATENT DOCUMENTS

| 6,199,107 B1* | 3/2001 | Dujari ........................... 709/219 |
| 6,374,260 B1* | 4/2002 | Hoffert et al. .......................... 1/1 |
| 2003/0046578 A1* | 3/2003 | Brown et al. .................. 713/200 |
| 2005/0033926 A1* | 2/2005 | Dumont ........................ 711/138 |

* cited by examiner

*Primary Examiner* — Hassan Kizou
*Assistant Examiner* — Tejis Daya
(74) *Attorney, Agent, or Firm* — Steven Greenberg, Esq.; Carey, Rodriguez, Greenberg & O'Keefe

(57) ABSTRACT

Embodiments of the present invention provide a method, system and computer program product for page request management for aggregated page content. In an embodiment of the invention, a method for page request management for aggregated page content can include issuing on behalf of a user a request for dynamically aggregated components in a page. The method further can include inserting into a header of the request a key computed as a combination of identifiers for the aggregated components and last modified data for the aggregated components. Finally, the method can include receiving in response to the request a new page of dynamically aggregated components for the user only if the computed key does not match a key computed for the new page. Otherwise, only a response is received indicating that the page has not been modified.

9 Claims, 2 Drawing Sheets

IF-NONE-MATCH FOR AGGREGATED PAGE DISTRIBUTION

BACKGROUND OF THE INVENTION

1. Field of the Invention

The present invention relates to the field of page refresh management and more particularly to the field of page refresh control using header fields in a content request.

2. Description of the Related Art

The advent of the Internet has given rise to new modes of computing unimaginable previously. Whereas personal computing prior to the widespread use of the Internet had been limited largely to the execution of computer programs in a single computing device, the advent of the Internet has enabled a multitude of different computing paradigms ranging from remote information gathering through the World Wide Web (the "Web") to hosted computing applications managed by service providers and accessible to remote users over the Internet. Substantial cost savings have been realized in deploying host computing applications utilizing Web page-like technologies such as portal computing aggregating different portlet views in a single page.

Basic remote information gathering through the Web generally requires the use of a Web browser through which Web pages can be located, accessed and rendered. As the speed at which content can be located, accessed and rendered largely depends upon communications bandwidth between the Web browser and page server, as well as the responsiveness of the page server, oftentimes, content browsing can be a painfully slow and frustrating process. To accelerate the process of retrieving content through the Web, caching mechanisms form part and parcel of any content distribution network. In a conventional cache, an oft retrieve page of content is stored locally so that a subsequent request for the content can be satisfied from the local storage without requiring retrieval of the page of content from over the Internet.

The physical mechanism through which content is cached and retrieved in the hypertext transfer protocol (HTTP) relies upon the use of header fields of HTTP requests. In this regard, in HTTP, the date and time in which requested page content had been last modified can be passed within an HTTP request for the requested page content. The function "If-None-Match" can be invoked upon the last modified date and time data to determine whether or not a previously cached form of the page content remains valid. If so, the previously cached form of the page content can be returned in lieu of retrieving the page content from the content source.

The "ETag" is a well-known alternative to the use of the last modified date when invoking If-None-Match. When using the ETag, the server sends a hash of the requested content in an ETag header along with the requested content. Exactly how this hash is determined remains entirely within the implementation discretion of the server. When the same data is requested subsequently, the ETag hash is included in the If-None-Match header of the request. If the requested content has not changed since the last request, the server will return a "304" status code and no further content just as in the case when using a last modified date with if-None-Match.

While the use of the last modified date or the ETag in If-None-Match for page refresh and cache management suffices for simplistic content, the modern world of content aggregation presents a larger problem. In particular, different component portions of a page may enjoy different last modified dates. Further, the visibility of a particular component of an aggregated page may vary from user to user according to access rights. As such, changes in access rights can affect the nature of presentation of a page without affecting the last modified date of the page. Finally, in that query results from a search engine disposed within a page can change from view to view, managing the use of If-None-Match is not without substantial challenges.

BRIEF SUMMARY OF THE INVENTION

Embodiments of the present invention address deficiencies of the art in respect to page refresh and cache management and provide a novel and non-obvious method, system and computer program product for page request management for aggregated page content. In an embodiment of the invention, a method for page request management for aggregated page content can include issuing on behalf of a user a request for dynamically aggregated components in a page. The method further can include inserting into a header of the request a key computed as a combination of identifiers for the aggregated components and last modified data for the aggregated components. Finally, the method can include receiving in response to the request a new page of dynamically aggregated components for the user only if the computed key does not match a key computed for the new page. Otherwise, only a response is received indicating that the page has not been modified.

In one aspect of the embodiment, a hash of the computed key is generated and inserted into the header in lieu of the computed key. In another aspect of the embodiment, an entity tag is inserting into the header of the request that includes the key computed as a combination of identifiers for the aggregated components and last modified data for the aggregated components. In yet another aspect of the embodiment, the key is computed as a combination of identifiers for those of the aggregated components deemed accessible to the user and also last modified data for those of the aggregated components deemed accessible to the user. Finally, in even yet another aspect of the embodiment, the response to the request can include a new page of dynamically aggregated components for the user only if the computed key does not match a key computed for a cached form of the page, but otherwise only a response is received that indicates that the page has not been modified.

In another embodiment of the invention, a content distribution data processing system can be configured for page request management for aggregated page content. The system can include a content server executing in memory of a host computer and configured for communicative coupling to content browsers over a computer communications network. The system also can include an if-none-match module coupled to the content server. The module can include program code enabled upon execution in the host computer to extract a key from a request from a requestor received in the content server for dynamically aggregated components in a page, to compute a key for the dynamically aggregated components requested in the request as a combination of identifiers for the dynamically aggregated components and corresponding last modified data, to compare the extracted and computed keys, and to indicate in response to the request when the extracted and computed keys match that the requested page has not been modified in lieu of returning a newly generated form of the page with the dynamically aggregated components to the requestor.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for page request management for aggregated page content. In accordance with an embodiment of the invention, a page request from a requesting user for aggregated content can be satisfied according to the identity of the requesting user with the aggregation of different components accessible by the requesting user into a single page. An identifier for each component in the single page can be determined along with last modified data. A key can be generated by combining the identifiers for each component in the page in conjunction with corresponding last modified data. The key can be returned along with the page to the requesting user. For subsequent requests for the page, the key can be provided along with the request and compared to a key generated for the requested page. If the keys match, there is no need to re-aggregate the page for the requesting end user. In this way, If-None-Match can function despite the aggregation of different components in a requested page and the disparate access rights to the different components by different requesting users.

Figure 1:
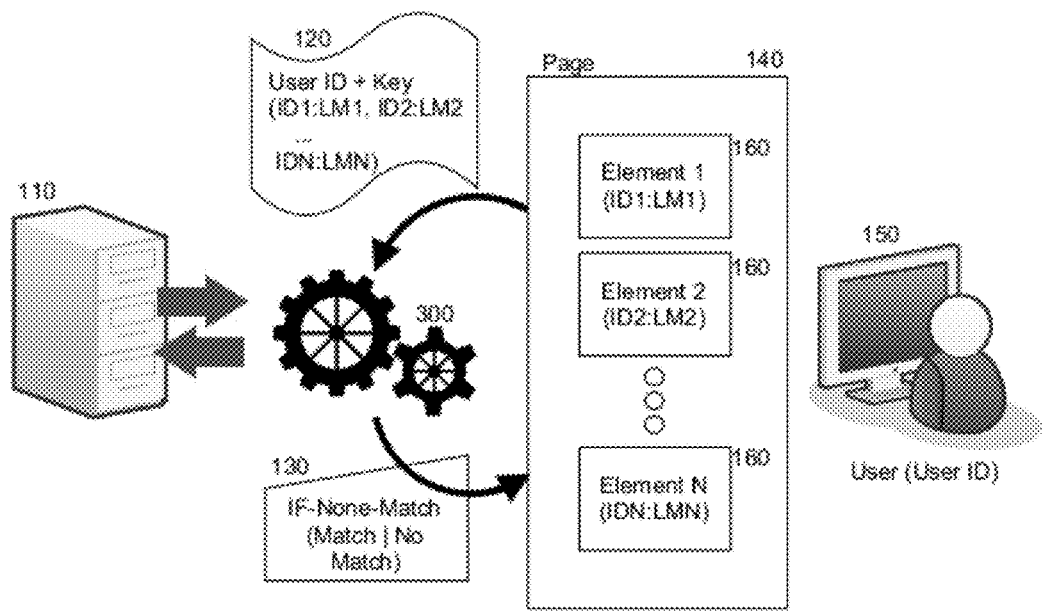
FIG. 1 is a pictorial illustration of a process for page request management for aggregated page content.

In further illustration, FIG. 1 pictorially depicts a process for page request management for aggregated page content. As shown in FIG. 1, an end user 150 can request a page 140 of aggregated components 160 from a page server 110, each of the components 160 being sourced separately as in the case of portlets aggregated into a portal page. Those of the aggregated components 160 visible to the end user 150 depend upon the access rights of the end user 150 to the individual aggregated components 160. If-None-Match processor 300 can generate a key 120 for the page 140 to include an identifier for each of the aggregated components 160 and last modified data for each of the aggregated components 160. Optionally, a hash can be created of the key 120. As a further option, the key 120 for the page 140 can include an identifier for each of the aggregated components 160, last modified data for each of the aggregated components 160 and a hierarchical path of each of the components 160 within the page 140. Thereafter, the key 120 can be returned to the end user 150 along with the requested page 140.

Subsequently, when a request is received to retrieve the page 140 by the end user 150, a header of the request can be inspected to extract an embedded key. The embedded key can be compared to the most current form of the key 120 for the requested page in an If-None-Match determination 130. If the key 120 matches, a new form of the page 140 need not be aggregated and returned to the end user 150. However, if the key 120 does not match, a new form of the page 140 will be aggregated. The circumstances in which the key 120 will not match include when the last modified data for one or more of the components 160 has changed, or when the arrangement of components 160 in the page 140 has changed. In the latter circumstance, a change in access rights based upon user identity can cause an additional component to appear in the page 140, or one or more of the components to fall absent from the page 140.

Figure 2:
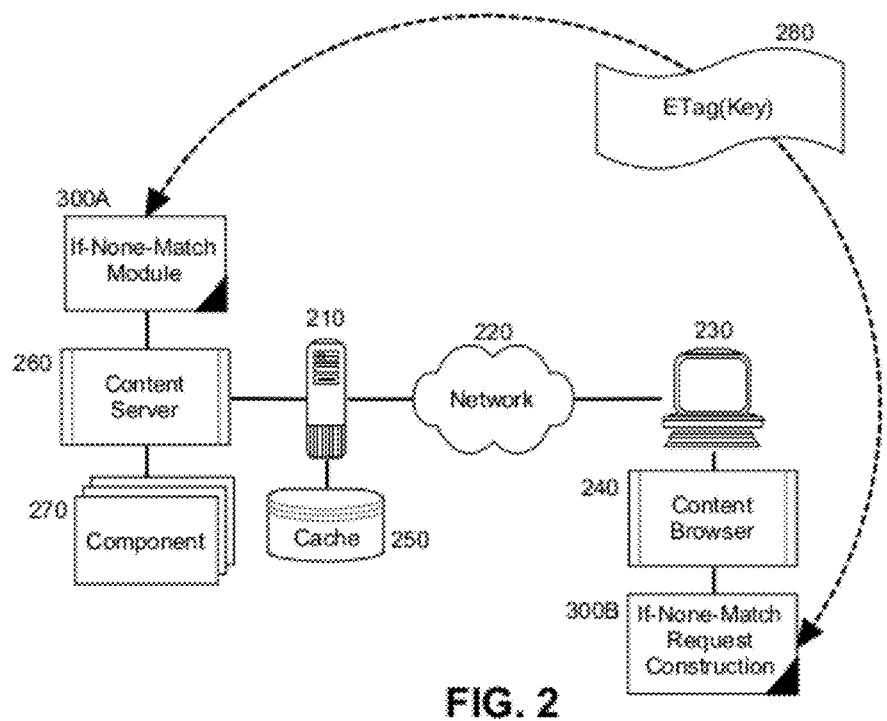
FIG. 2 is a schematic illustration of a content distribution data processing system configured for page request management for aggregated page content; and, FIG. 3 is a flow chart illustrating a process for page request management for aggregated page content.

The process described in connection with FIG. 1 can be implemented within a content distribution data processing system. As such, FIG. 2 is a schematic illustration of a content distribution data processing system configured for page request management for aggregated page content. The system can include a host server 210 communicatively coupled to different computers 230 over a computer communications network 220 (only a single computer shown for ease of illustration). The host server 210 can include a content server 260 configured to serve content to requesting end users over the computer communications network 220. The content can include an aggregation of components 270 including feeds from different content sources, applets, search results and the like. In this regard, the content can be aggregated and served to requesting end users in response to received requests, or where appropriate the content can be served from cache 250 subsequent to aggregation.

In operation, a content request can be issued on behalf of an identified end user by a content browser 240 executing in memory of a computer 230 to the content server 260 for dynamically aggregated content. The content server 260 in turn can aggregate the requested content dynamically from amongst different ones of the components 270 accessible to the end user. Thereafter, an If-None-Match module 300A coupled to the content server 260 can compute a key unique to the dynamically aggregated content based upon an identifier for each dynamically aggregated one of the components 270 and corresponding last modified data. Optionally, the computed key can be hashed to produce a compact form of the key. As a further option, the key can include an identifier for each of the aggregated one of the components 270, last modified data for each of the aggregated one of the components 270 and a hierarchical path of each of the aggregated one of the components 270. Subsequently, the key can be returned in a header of a response to the request to the content browser 240 along with the dynamically aggregated content.

At a later time, a request can be formulated to dynamically aggregate the content in the content browser 240. If-None-Match request construction logic 300B can respond to the request to dynamically aggregate the content by computing the key in the same way as the If-None-Match module 300A. The resulting key (including an optionally hashed form of the computed key) can be included in the request to dynamically aggregate the content, for instance in an ETag 280. Upon receipt of the request to dynamically aggregate the content, the computed key can be extracted from the ETag and compared to a key computed for the aggregated content in a pre-processing step. If the computed keys match, a "not modified" response can be returned without further content. Otherwise, the requested aggregated content can be dynamically re-generated.

Optionally, to support server-side caching, different dynamically generated renditions of the aggregated content can be cached separately in the cache 250. The cache keys for each dynamically generated rendition can incorporate the computed key for the aggregated content. In this way, upon extraction of the ETag 280 in a request for dynamically aggregated content, a cached rendition can be located so as to avoid the necessity to regenerate the content, or even to pre-process the aggregation to determine if the computed keys match. In this instance, a "non modified" message can be returned to the requesting end user.

Figure 3:
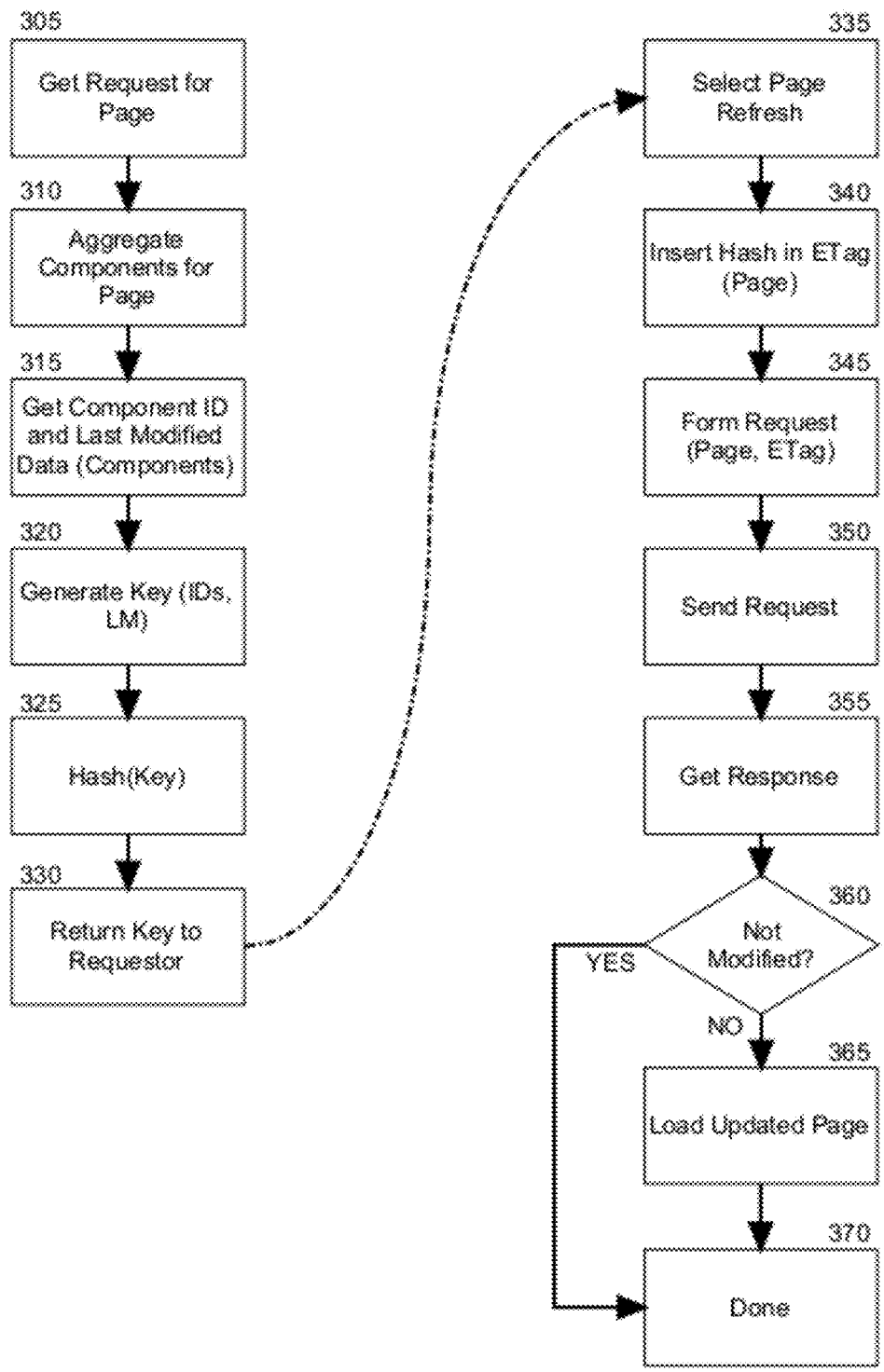

In even yet further illustration of the operation of the If-None-Match module 300A and If-None-Match request construction logic 300B, FIG. 3 as a flow chart illustrates a process for page request management for aggregated page content. Beginning in block 305, a request can be received to dynamically aggregate components into a page. In block 310, the requested aggregation can be performed subject to the access rights of the requestor. In block 315, a component identifier and last modified data can be determined for each component dynamically aggregated into the page. Thereafter, in block 320 a key can be computed based upon a combination of the determined identifiers and last modified data. As an option, the key for the page can include the determined identifiers, the last modified data and a hierarchical path of each component within the page. Optionally, in block 325, the computed key can be hashed to produce a more compact form of the key. Finally, in block 330 the computed key can be returned to the requestor.

In block 335, the requestor can select the dynamic re-aggregation of the components in the page. In block 340, the previously computed key can be inserted into an ETag header and a request for the dynamic aggregation of the components in the page can be formed with the ETag header in block 345. In block 350 the request can be transmitted to the content server and a response can be received in block 355. The response can include, by way of example, "304 Not Modified" or "200 OK", the former in decision block 360 indicating a match of the computed key in the ETag, and the later indicating no match. In the latter instance, in block 365 the returned page of aggregrated components can be received and re-rendered in the content browser. Finally, in block 370 the process can end.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A content distribution data processing system configured for page request management for aggregated page content, the system comprising:
    a processor and memory;
    a content server executing in memory of a host computer and configured for communicative coupling to a plurality of content browsers over a computer communications network; and, an if-none-match module coupled to the content server, the module comprising program code enabled upon execution in the host computer to
        (A) extract a key from a request from a requestor received in the content server for dynamically aggregated components in a page,
        (B) compute a key for the dynamically aggregated components requested in the request as a combination of identifiers for those of the aggregated components deemed accessible to the user and last modified data for the aggregated components deemed accessible to the user;
        (C) compare the extracted and computed keys; and,
        (D) indicate in response to the request when the extracted and computed keys match that the requested page has not been modified in lieu of returning a newly generated form of the page with the dynamically aggregated components to the requestor.

2. The system of claim 1, further comprising a cache of previously generated pages of dynamically aggregated components, each previously generated page comprising an association with a cache key including a combination of identifiers for dynamically aggregated components of a corresponding previously generated page and last modified data for the dynamically aggregated components of the corresponding previously generated page.

3. The system of claim 1, wherein the extracted key is extracted from an entity tag in the request.

4. The system of 1, wherein the key is computed as a combination of identifiers for the aggregated components, last modified data for the aggregated components and a hierarchical path of each of the aggregated components.

5. A computer program product for page request management for aggregated page content, the computer program product comprising:
    a computer readable storage medium having computer readable program code embodied therewith, the computer readable program code comprising:
    computer readable program code for issuing on behalf of a user from a content browser executing in memory of a computer a request for dynamically aggregated components in a page;
    computer readable program code for inserting into a header of the request a key computed as a combination of identifiers for those of the aggregated components deemed accessible to the user and last modified data for the aggregated components deemed accessible to the user; and,
    computer readable program code for receiving in response to the request a new page of dynamically aggregated components for the user only if the computed key does not match a key computed for the new page, but otherwise receiving only a response indicating that the page has not been modified.

6. The computer program product of claim 5, further comprising computer readable program code for generating a hash of the computed key and inserting the hash into the header in lieu of the computed key.

7. The computer program product of claim 5, wherein the computer readable program code for inserting into a header of the request a key computed as a combination of identifiers for the aggregated components and last modified data for the aggregated components, comprises computer readable program code for inserting into a header of the request an entity tag comprising a key computed as a combination of identifiers for the aggregated components and last modified data for the aggregated components.

8. The computer program product of claim 5, wherein the computer readable program code for inserting into a header of the request a key computed as a combination of identifiers for the aggregated components and last modified data for the aggregated components, comprises computer readable program code for inserting into a header of the request a key computed as a combination of identifiers for the aggregated components, last modified data for the aggregated components and a hierarchical path of each of the aggregated components.

9. The computer program product of claim 5, wherein the computer readable program code for receiving in response to the request a new page of dynamically aggregated components for the user only if the computed key does not match a key computed for the new page, but otherwise receiving only a response indicating that the page has not been modified, comprises computer readable program code for receiving in response to the request a new page of dynamically aggregated components for the user only if the computed key does not match a key computed for a cached form of the page, but otherwise receiving only a response indicating that the page has not been modified.

* * * * *